INVENTORS
MORRIS R. WEINGARTEN,
FRANK D'AUGUSTINE &
GLENN R. BANGE
BY William A. Zaluzak
ATTORNEY

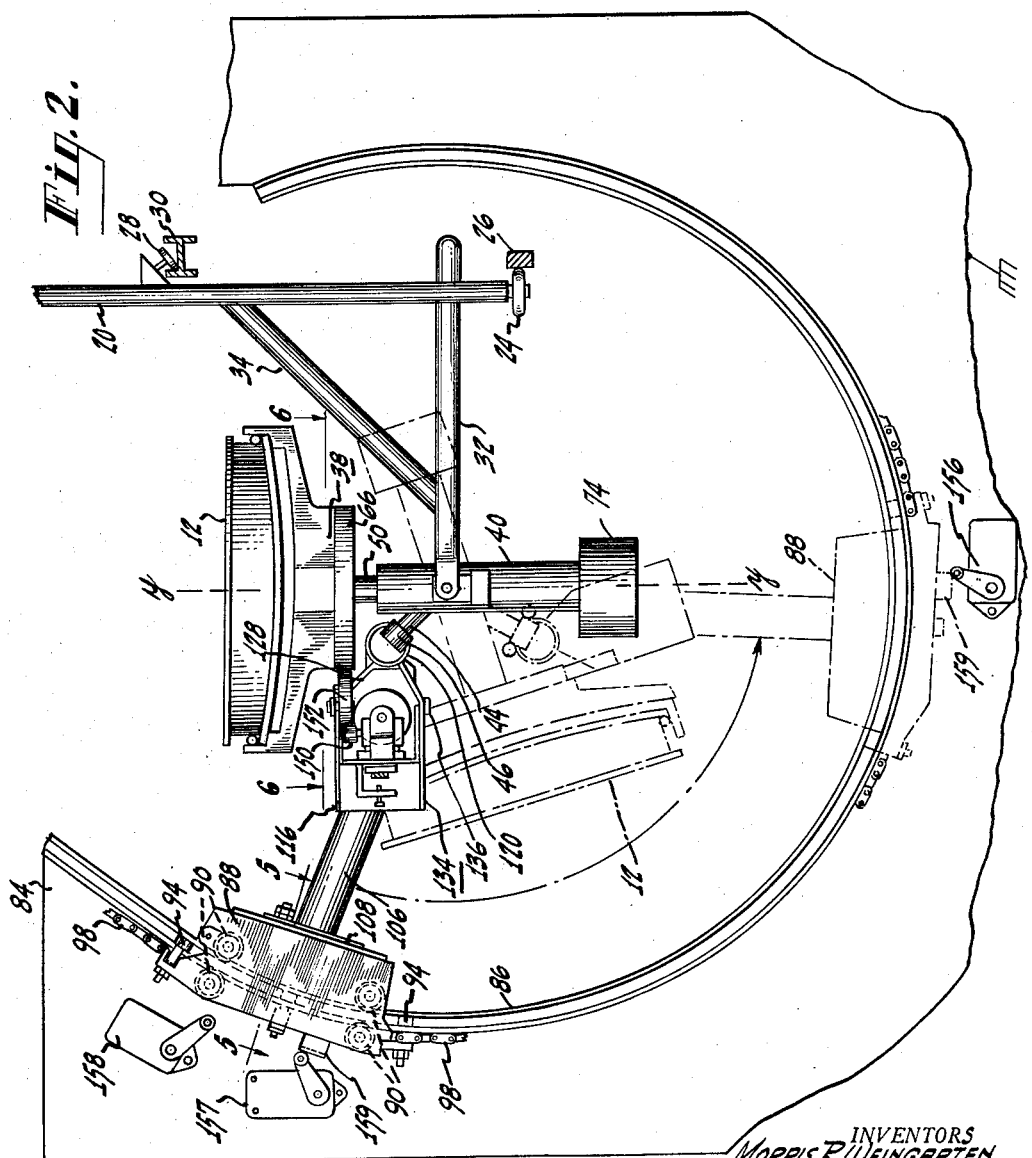

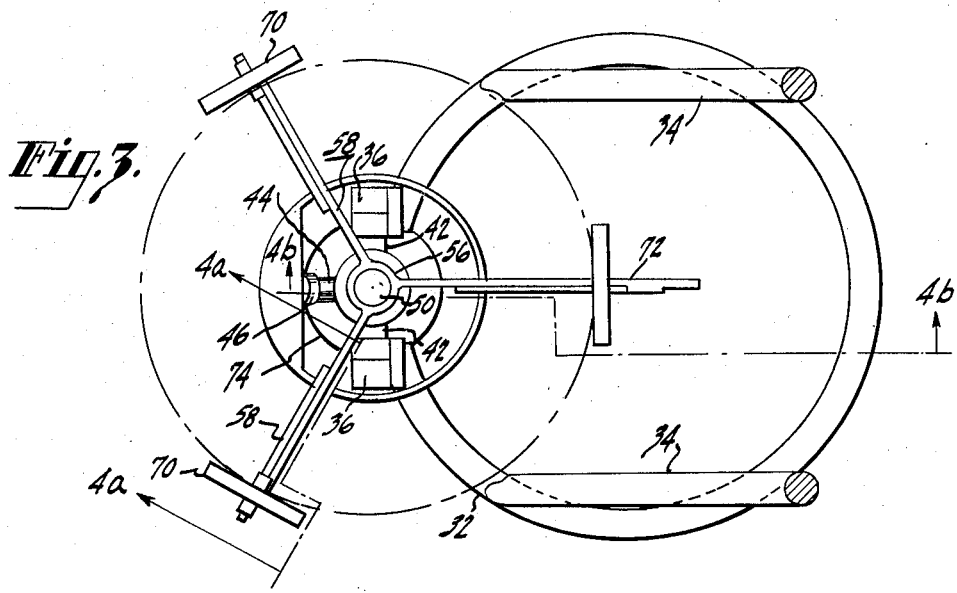
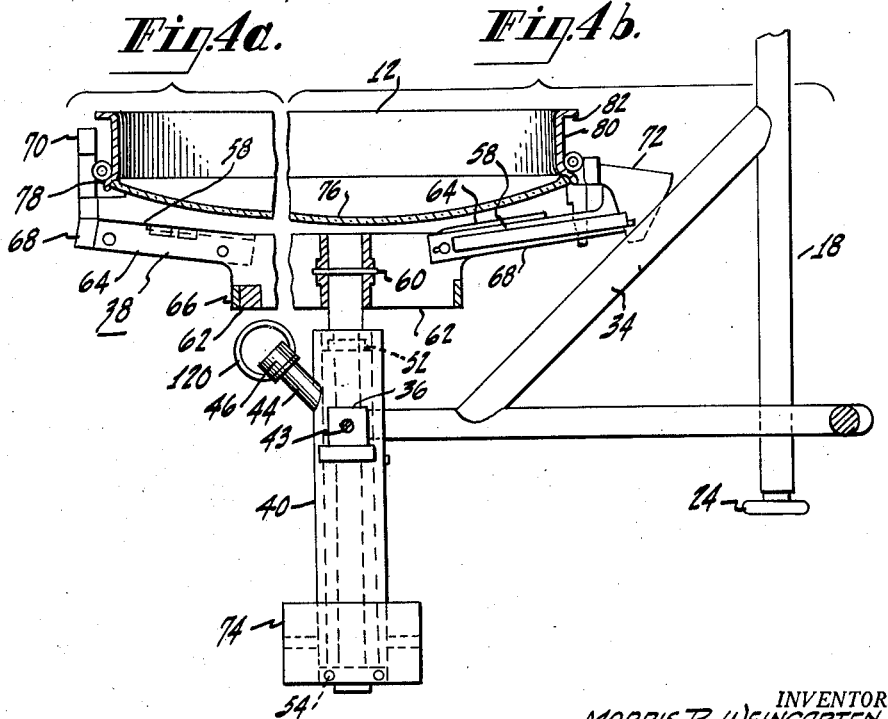

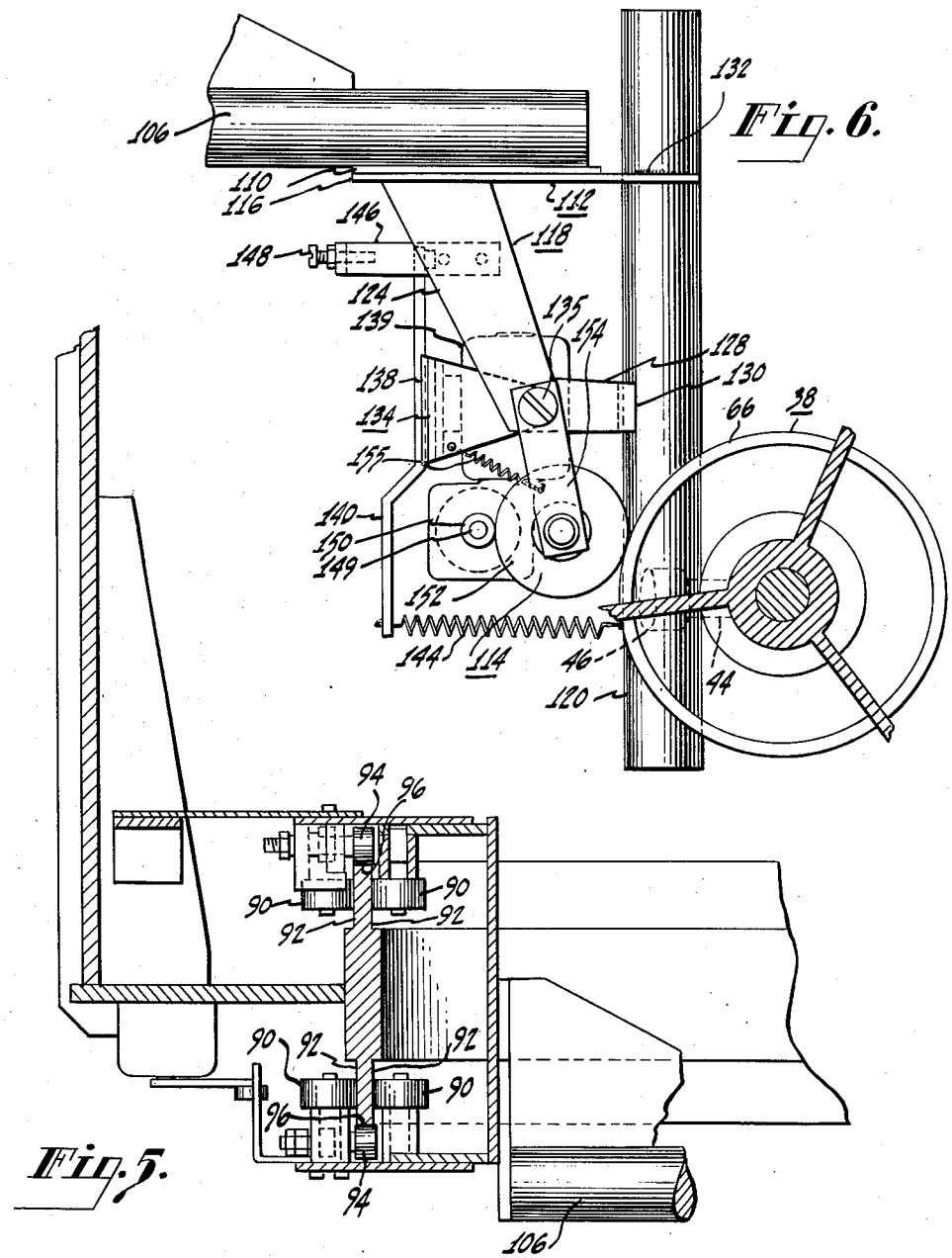

Sept. 8, 1959 M. WEINGARTEN ET AL 2,902,973
COATING APPARATUS
Filed Aug. 23, 1956 7 Sheets-Sheet 5

INVENTORS
MORRIS R. WEINGARTEN,
FRANK D'AUGUSTINE &
GLENN R. BANGE
BY William A. Zalesak
ATTORNEY Sept. 8, 1959     M. WEINGARTEN ET AL     2,902,973
COATING APPARATUS
Filed Aug. 23, 1956     7 Sheets-Sheet 6
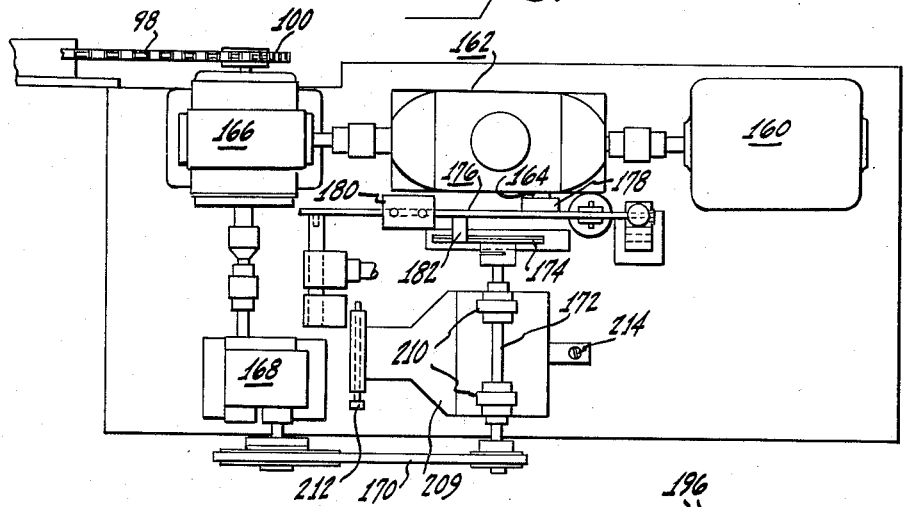
INVENTORS
MORRIS R. WEINGARTEN
FRANK D'AUGUSTINE &
GLENN R. BANGE
BY William A. Balcsak
ATTORNEY

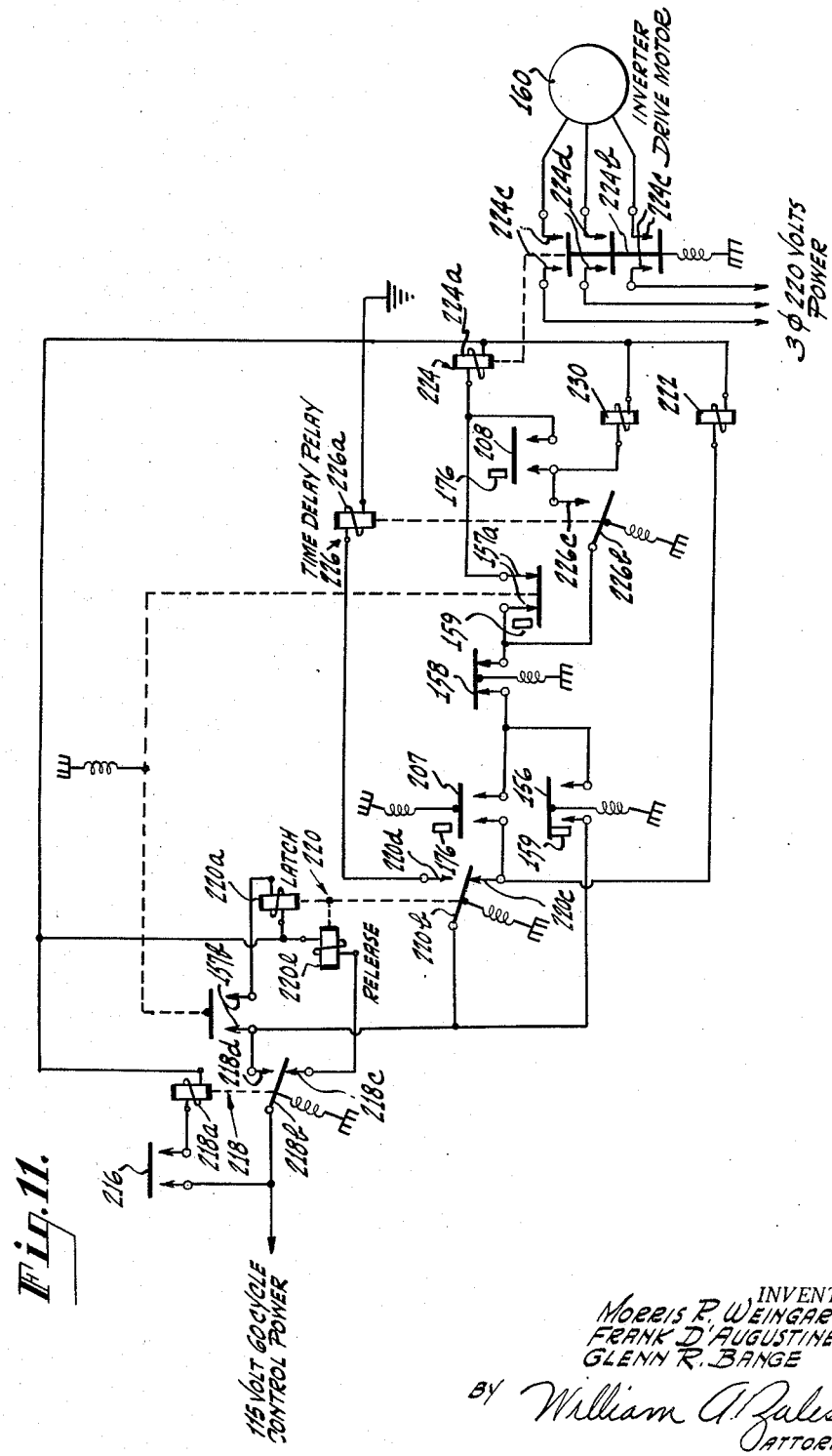

United States Patent Office 2,902,973
Patented Sept. 8, 1959

2,902,973

COATING APPARATUS

Morris Weingarten, Frank D'Augustine, and Glenn R. Bange, Lancaster, Pa., assignors to Radio Corporation of America, a corporation of Delaware Application August 23, 1956, Serial No. 605,780

17 Claims. (Cl. 118—56)

This invention relates to apparatus for applying fluid coating material to a foundation, and is herein described as embodied in a machine for applying a phosphor coating to the target surface of the screen plate of a cathode ray tube.

The envelope of a cathode ray tube is usually formed by joining a face plate panel, or cap shaped member to a funnel shaped member. The face plate panel, hereinafter referred to as the "panel," includes a screen plate, or glass face plate, serving as a foundation for a phosphor coating. The panel is sometimes made entirely of glass, and sometimes is formed by joining the glass face plate to a metallic rim.

One method of coating the face plate of a cathode ray tube with a phosphor adapted to produce images in color involves first cleaning or washing the glass face plate of the panel, and then swirling a slurry suspension of one of the color phosphors on the cleaned face plate to form a thin phosphor containing coating over the face plate. The slurry suspension includes a water soluble photo-resist, or light sensitive material. The phosphor coating is then dried and is exposed to ultra violet light through a suitably formed masking member. The areas of the phosphor and photoresist where the light strikes become hard, due to the presence of the photo-resist, and adhere firmly to the face plate. Furthermore, the ultra violet light renders the photo-resist in the exposed areas insoluble in water, whereas in the unexposed areas the photoresist retains its solubility in water. Hence, when the screen is washed in water, in the next step, the material in the unexposed areas is dissolved and removed, but the areas previously exposed to light remain undisturbed to form the desired pattern of phosphor areas. The screen is then dried, and the above method is repeated for the other color phosphors to produce a multi-color phosphor screen.

In the past, many of these operations have been performed manually and by rather tedious and time consuming operations. The method of swirling the phosphor suspension, in particular, involves rotating the panel and simultaneously tilting the same through a desired angle to obtain uniform and complete coverage of the face plate with the phosphor slurry mixture and to spill out of any excess slurry material. The success of this manual method in producing screens which have adequate uniformity and complete coverage, and which are free from holes or streaks, has been largely dependent on the skill of the operator. Even a skillful operator, however, can not give exactly the same treatment to each face plate. Hence, when defects in the screen have arisen, it has been difficult to determine their cause because of the many variable human factors involved.

Accordingly, an important object of this invention is to provide an apparatus for increasing the efficiency and uniformity of a coating operation;

Another object is to provide an apparatus for automatically subjecting a workpiece to a series of motions during a coating operation, so as to improve the efficiency of the operation and the quality of the product;

A further object is to provide a novel and advantageous apparatus for applying a uniform coating of fluid ingredients to the face plate of a cathode ray tube; and Another object is to provide apparatus for automatically spreading a coating of phosphor suspension or other material over the face plate of a cathode ray tube, whereby the coating operation may be performed quickly, efficiently, and with a minimum of human error.

These and other objects are achieved in accordance with the invention by the provision of a novel apparatus which mechanically performs a coating operation, thereby avoiding the limitations inherent in manual practices. The apparatus of the invention includes several important aspects. One of these aspects involves a rotatable and pivotally mounted holder adapted to support a work piece such as the face plate panel of a color cathode ray tube, with the cavity thereof extending upwardly. According to another aspect, separate means are provided for simultaneously rotating the holder on an axis thereof coincident with the major axis of the work piece received thereby, and on an axis normal to the first axis. The two rotational movements produce a swirling effect on the fluid material deposited on the center of the work piece and uniformly deposits a coating of the material on the face plate.

In the drawings:

Fig. 2 is a side elevation of the apparatus of Fig. 1;

Fig. 3 is a plan view partly in section of a carrier which is used in the apparatus of the invention and which includes a holder for the panel;

Fig. 4a is a view partly in section taken on line 4a—4a of Fig. 3;

Fig. 4b is a view partly in section taken on line 4b—4b of Fig. 3;

Fig. 5 is a section taken along the lines 5—5 of Fig. 2;

Fig. 6 is a section taken along the lines 6—6 of Fig. 2 showing means for spinning the panel and its holder;

Fig. 8 is a plan view of a novel inverter drive unit used in the apparatus of the invention;

Fig. 9 is a side elevation of the inverter drive unit of Fig. 7;

Fig. 10 is a perspective view of a speed control mechanism included in the inverter drive unit of Figs. 7 and 8; and Fig. 11 is a schematic drawing of the electrical controls for the apparatus of the invention.

Figure 1:
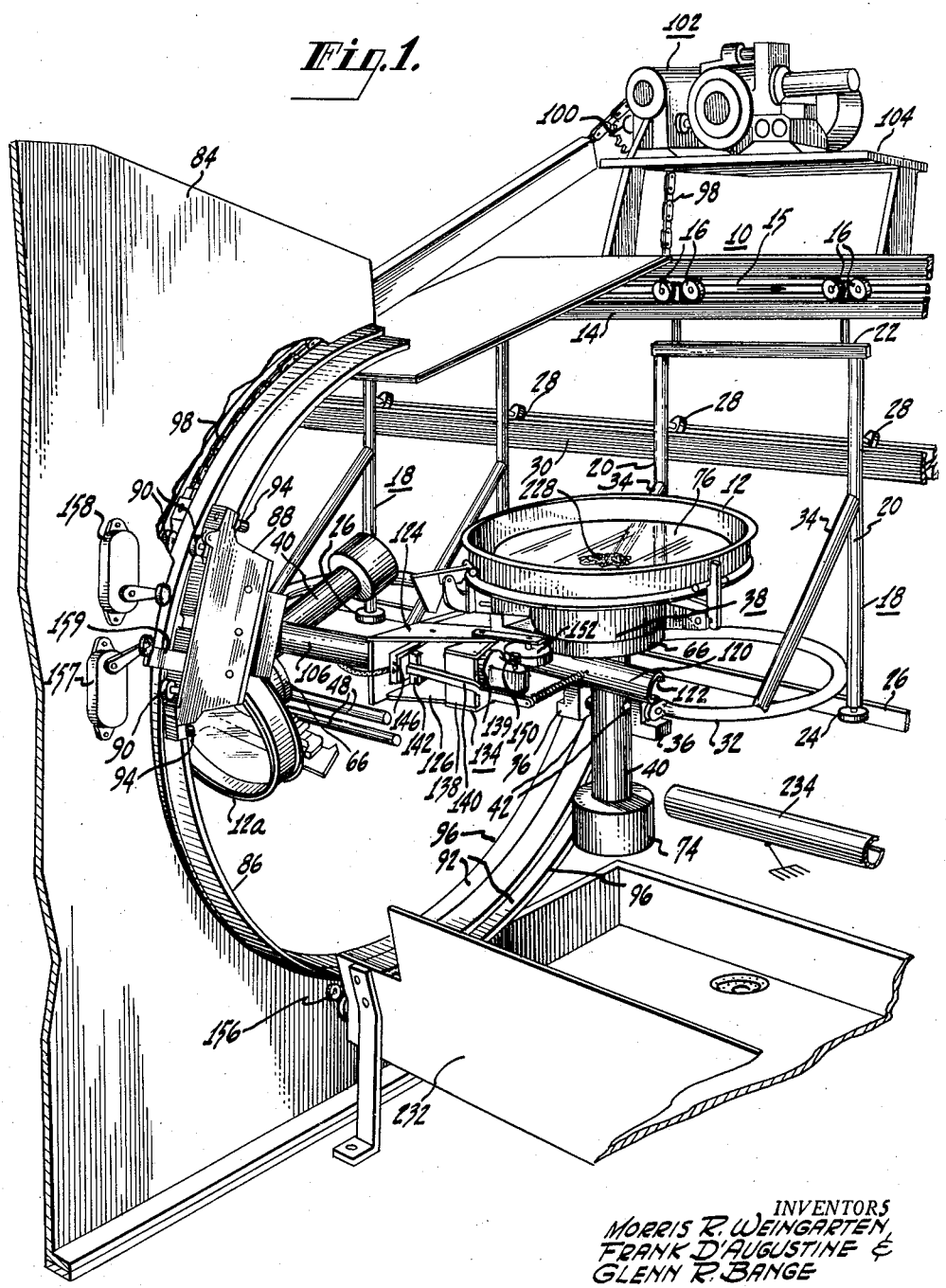
Fig. 1 is a perspective view of an apparatus embodying the invention.

Referring to Figs. 1 and 2, there is shown a conveyor apparatus 10 adapted to transport a plurality of cathode ray tube panels in spaced relation along a desired path. For simplicity only two panels 12 and 12a are shown.

The conveyor apparatus 10 comprises a stationary upper track or guide rail 14 on which is mounted a chain comprising links 15, interconnecting wheels 16 arranged in spaced groups of two each, for movement along track 14.

A movable carrier 18 extends downwardly from two adjacent groups of the wheels 16 and is adapted to support a panel 12. The carrier 18 comprises a pair of parallel stanchions 20 and a transverse bar 22 connecting the top ends of the stanchions. The bottom end of each stanchion 20 has a roller 24 axially connected therewith which engages a lower stationary track 26. In addition, each stanchion 20 has mounted thereon an angularly inclined roller 28. The inclined rollers 28 engage a third stationary track 30 of I beam construction which is intermediate the other two tracks 14 and 26. All three tracks 14, 26, 30 are parallel to each other. When the wheels 16 are urged to move along the upper track 14, the carrier 18 attached thereto is borne along and in engagement with the intermediate and lower tracks 30, 26 by means of the rollers 28, 24. In this manner carrier 18 can be indexed from one station to another in any desired meanner.

The carrier 18 also includes an annular support member 32 attached to each stanchion 20 at a lower portion thereof so that the said support member is disposed in a horizontal plane. A pair of struts 34 support the annular support member 32 from the stanchions 20.

The annular support member 32 is in the form of a partially closed ring having its ends remote from the stanchions 20, and connected to a pair of opposing pivot mounting blocks 36. For holding and imparting various motions to the panel 12, a panel holder assembly 38 is pivotally supported between the mounting blocks 36.

As seen in more detail in Figs. 3, 4a and 4b, the panel holder assembly 38 comprises a cylindrical spindle housing 40 having a pair of trunnions 42 which cooperate with bearings 43 in the mounts 36 mounted on the annular support member 32 to permit the panel holder assembly 38 to be tilted about a horizontal axis. In order to permit the housing 40 to be grasped for tilting, it is provided with a short arm or stub 44 which terminates in a roller 46. During its travel between the various stations, the roller 46 cooperates with a tilt rail 48 (Fig. 1) which twists and rises or dips at various locations to provide a desired angle of tilt to the holder assembly 38.

The panel holder assembly 38 includes a spindle 50 supported for rotational movement within the spindle housing 40 by bearings 52 and 54 at each end of the housing 40. A hub 56 provided with three spokes 58 is fastened to one end of the spindle 50 by means of a pin 60. Each spoke 58 is formed with an offset inner portion 62 which is stepped down to an outer portion 64. A circular rim 66 is mounted on the spokes 58 and fastened to edge portions of each of the offset portions 62. The rim 66 has a machined outer surface adapting it for frictional drive. An extension arm 68 is slidably fastened to each spoke 58. To fixed stops 70 and a releasable clamp 72 are mounted on the ends of extension arms 68 for gripping the panel 12 at three spaced points. This clamp 72 is shown by way of example only and does not constitute a part of the invention. The extension arms 68 are adjustable in a radial direction to accommodate panels of various sizes. Thus, when a driving force is applied to the rim 66, the panel 12 may be spun about the axis of the spindle 50. A counterweight 74 is provided on the end of the spindle housing 52 opposite the panel 12.

The panel 12, which is to be provided with the multicolor phosphor screen, comprises a circular glass face plate 76, usually curved, which is hermetically sealed to one of the flanges 78 of a metallic rim 80. The opposite end of the rim 80 has a second flange 82, which is adapted to be joined to a funnel-shaped member, not shown, to form the envelope of the cathode ray tube.

In its journey on the conveyor as above described, the panel 12 is permitted to stop at one of the stations for the reception of a phosphor coating. Apparatus is provided at this station in accordance with the invention to perform the coating process. Referring to Figs. 1, 2 and 5 the apparatus comprises a structural frame 84 supporting a track 86 formed in the shape of a nearly complete circle, disposed transversely to and in the path of travel of the panel 12. A cart or dolly 88 is mounted on the track 86 so that it extends inwardly of the track circle. For permitting the dolly 88 to be moved along the track 86, the dolly 88 is equipped with four sets of rollers 90 which engage four machined surfaces 92 on the marginal portions of the track, as shown in more detail in Fig. 5. To guide the dolly 88 on the track 86, four additional rollers 94, only two of which are visible, are provided to engage the two edges 96 of the track 86.

A roller chain 98 (Fig. 2) is attached to the front and back of the dolly 88 and is looped rather tautly around the track 86 so that the chain rolls on one of the four machined surfaces 92. The chain 98 is driven by a sprocket 100 (Fig. 1) located in the output of a driving mechanism or inverter drive unit 102, to be described and which is supported on a platform 104 at an elevated position.

Referring to Figs. 1, 2, and 6, the dolly 88 is provided with an arm 106 which extends radially inwardly of the circular track 86. The arm 106 has base plates 108 and 110 at each end. Base plate 108 at one end of the arm 106 is secured to the mounting surface of the dolly 88. On the other end of the arm 106 is mounted a structure 112 supporting a drive mechanism 114 for rotating or spinning the holder 38 and panel 12 about an axis $y$ (Fig. 2) perpendicular to the plane of the track 86. The support structure 112 comprises a mounting plate 116 secured to the base plate 110, a mounting yoke 118, and an elongated roller guide member 120. The roller guide member 120 is tubular in shape and is formed with a slot 122 extending along its length so as to permit the roller 46 of the holder 38 to be received therein and gripped for tilting. The yoke 118 comprises a pair of arms 124 and 126 (Fig. 1) secured to the mounting plate 116. The arms 124 and 126 of the yoke 118 terminate in a U shaped portion 128 extending to one side of the arms 124 and 126. The base 130 of the U shaped portion 128 is secured to guide member 120 intermediate the ends of the latter and at a portion remote from slot 122. The tubular guide member 120 is also secured at one end portion 132 to the mounting plate 116 to form a rigid structure.

A yoke like motor mount 134 is pivotally supported within the yoke 118 about shoulder screws 135 and 136, and carries within it and secured to the base 138 of the motor mount, a drive motor 139. Also secured to the base 138 is an elongated bar 140, one end of which supports a counterweight 142. The other end of the bar 140 is secured to a tension spring 144 which is connected to an end portion of the roller guide member 120. An L-shaped stop bracket 146 secured to one arm 124 of the yoke 118 carries an adjustable limit screw 148 which limits the movement of the drive mechanism 114.

In more detail, the drive mechanism 114 comprises the drive motor 139 having a right angle output shaft 149 which carries a friction wheel 150. An idler wheel 152 is pivotally supported from the yoke 118 by a link 154 and shoulder screw 135 and is maintained in frictional engagement with the friction wheel 150 by a tension spring 155 secured between the motor mount 134 and the link 154.

Figure 7:
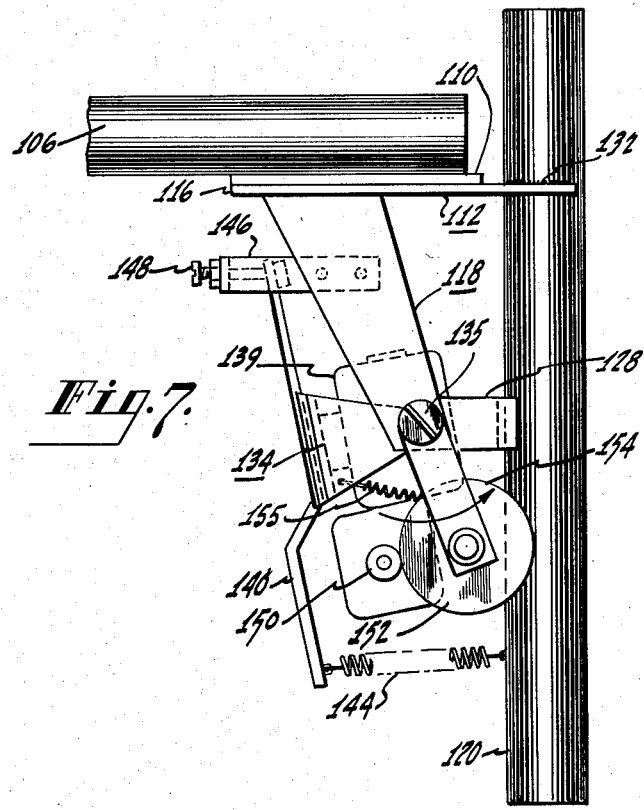
Fig. 7 is a sectional view similar to Fig. 6 and showing the spinning means disengaged from the holder.

In the absence of the carrier 18 and holder 38 at the coating station the tension spring 144 maintains the end of the bar 140 in engagement with the limit screw 148, and the entire drive mechanism 114 assumes the position shown in Fig. 7. Then, when the carrier 18 enters the coating station, the rim 66 of the holder 38 engages the idler wheel 152 and exerts a force in opposition to spring 144 on the idler wheel 152 and pivots the entire drive mechanism 114 about the shoulder screws 135 and 136 to the position shown in Fig. 6. Thereafter, the tension spring 144 maintains the rim 66 and idler wheel 152 in frictional contact.

Switches 156, 157, and 158 (Fig. 2) are mounted on the frame 84 and are positioned to be tripped by a bar 159 on the dolly 88 at various positions of the dolly 88 on the track 86. The operation of these switches will be described later.

The inverter drive unit 102 (Figs. 1, 8, 9 and 10) has an output which is automatically controllable both in speed and direction. It operates to drive the dolly 88 in either direction along the circular track 86 and at a controllable speed, so as to tilt the panel 12 at a continuously varying angle between a position in which its open end is down or approximately 70° from the vertical, corresponding to the position of panel 12a shown in Fig. 1, and a position in which its open end is up or approximately 170° position, corresponding to the position of panel 12. By a 70° position is meant a position in which the panel 12 is rotated 70° from a fully inverted position. By a 170° position is meant a position in which the panel 12 is rotated 170° from the fully inverted position. Referring to Figs. 8–10, the inverter drive unit 102 comprises a constant speed drive motor 160 whose output is coupled to a hydraulic transmission unit 162. The output of the hydraulic transmission 162 is controllable both in speed and direction in accordance with the amount and direction of the movement applied to its speed control shaft 164.

The output of the transmission unit 162 is coupled to a first gear box or speed reducer 166 having a speed reduction ratio of 20:1. One of the two outputs of the speed reducer 166 is coupled directly to the drive sprocket 100 and chain 98 for driving the dolly 88. The other output of the first speed reducer 166 is coupled to a second gear box or speed reducer 168 having a speed reduction ratio of 16:1. The output of the second speed reducer 168 is coupled through a timing belt 170 to the shaft 172 of a cam 174 which operates a speed control lever 176 attached to the control shaft 164 of the hydraulic transmission 162.

The speed control lever 176 is fixed to the control shaft 164 by means of a clamp 178 at a point intermediate the ends of the lever 176, and can pivot with the control shaft 164 about that point through an angle of 20° on each side of the horizontal position of the lever 176, or through a total angle of 40°. A counterweight 180 is attached to one end of the control lever 176 so as to permit the cam 174 to engage a cam follower 182 located on the lever 176 at a point intermediate the counterweight 180 and the pivot point. The other end of the control lever 176 is connected to a vertically operated piston 184 of a pneumatic cylinder 185 having a valve arrangement, not shown, which is controlled by a pair of solenoids shown schematically in Fig. 11 and to be described in connection with said Fig. 11. The solenoids, when selectively energized, operate the valves to admit air to the pneumatic cylinder, to either extend the piston 184 upward or retract it downward. As shown in Fig. 9, the piston 184 is in upwardly extended position. Inasmuch as the construction and operation of pneumatic cylinders is well known, no further description is given.

The piston 184 has a piston rod 186 extending upwardly from the top of the cylinder housing 188 and terminating in a clevised rod connector 190. One end of a link 192 is connected to the rod connector 190 at a pivot point 194. The other end of the link 192 is forklike and is arranged to grasp the control lever 176 within its legs 196 by means of a guide pin 198 attached to the lever 176 and extending through elongated slots 200 in the legs 196, one of the slots 200 being shown. A nut 202 on the rod connector 190 cooperates with a clamp or stop 204 on the top of the cylinder housing 188 to limit the maximum downward movement of the piston 184 and hence the clockwise rotation of the control shaft 164. Another stop 206 fixed to the platform 104 cooperates with the end of the control lever 176 to limit the counterclockwise rotation of the control shaft 164. Switches 207 and 208 are positioned to be tripped by the vertical movement of the counterweight end of the control lever 176. The operation of these switches will be described later.

An important feature of the invention resides in the fact that the angular position of the workpiece or panel 12 controls the speed of motion or tilting rate of the panel 12. This results from the feedback relationship established between the cam 174 and the tilting track 86, whereby the angular position of the cam 174 is related to the angular position of the dolly 88 on the track 86 and hence the panel 12. Thus, by suitably shaping the contour of the cam 174, any desired tilting rate may be imparted to the panel 12 at the various angular positions of the panel 12. This flexibility in tilting rate is desirable in order to accommodate phosphor slurry suspensions which may have different physical properties, such as different viscosities, for example.

In addition, the vertical position of the cam 174 is adjustable so as to vary the angular position of the control lever 176, thereby allowing flexibility in controlling the output speed range of the transmission 162 and the cycling time of the cam 174. In this way, the interval of time alloted for the phosphor coating cycle may be changed while the same percentage variation in tilting speed of the panel 12 is maintained. For this purpose the cam shaft 172 is mounted on a plate 209 by means of two cam shaft bearings 210. One side of the cam mounting plate 209 is mounted on a pivot 212 and the other side is supported by a height adjusting screw 214. A single adjustment of the screw 214 raises or lowers the entire cam shaft 172 and the cam 174 to the desired position.

The operation of the apparatus according to the invention will now be described with the aid of Fig. 11 which is a schematic circuit diagram of the electrical controls for the apparatus. As the carrier 18 indexes into the station where the phosphor coating is to be applied to the face plate 76 of the panel 12, it has left a prior station where the panel was washed and dried, and hence the panel enters the instant station in a somewhat inverted position, as shown in phantom in Fig. 2. At this time, the dolly 88 is in its lower position, shown in phantom, and the switch 156 is engaged by the trip bar 159 so that the contacts of switch 156 are open, as shown in Fig. 11.

As the machine is indexed, the roller 46 of the carrier 18 enters the roller guide member 120 which is aligned with the tilt rail 48 at that particular angle of inversion of the panel 12 (Fig. 2). The drive motor 139 is continually in operation, so that when the rim 66 of the holder 38 engages the idler wheel 152 (Fig. 6) the rim 66 is driven continuously to spin the panel 12 at a constant speed while holder 38 is at this station.

As carrier 18 is indexed into the coating station, shown in Figs. 1 and 2, a switch 216 is closed by mechanically connecting switch 216 to the mechanism producing intermittent movement of the carrier 18 on the track 14 in any appropriate manner. Upon closing of the switch 216, (Fig. 11) the coil 218a of relay 218 is energized, and the movable contact arm 218b thereof moves from contact 218c to contact 218d. When contact 218d is closed, a circuit is closed through contact 220c and the movable contact arm 220b of a relay 220 to a solenoid 222.

The solenoid 222, when energized, operates valves of the air cylinder 185 (Fig. 9) such that the piston 184 moves downward, moving the control lever 176 and the shaft 164 in a maximum clockwise direction limited by the engagement of the nut 202 on the lower stop 204. At this time, the guide pin 198 engages the upper bearing surfaces of the slots 200, and the control lever 176 and its cam follower 182 is lifted off the cam 174 so that the cam 174 has no control over the position of the lever 176. At the same time, the counterweight end of the control lever 176 is urged upwards to strike switch 207 (Figs. 9 and 1) closing the contacts thereof.

When the contacts of the switch 207 are closed a circuit is completed through switches 158, 157–A (one-half of switch 157, Fig. 2), and the coil 224a of a contactor relay 224 which controls the power to the inverter drive motor 160. When the contactor coil 224a is energized, the movable armature 224b closes three sets of contacts 224c, 224d, 224e to close circuits to a three-phase voltage supply (Fig. 11) for operating the inverter drive motor 160. The inverter drive motor 160 is thus energized and the output of the transmission 162 is operated at high speed to drive the dolly 88 from its lower position (shown in phantom in Fig. 2) to an upper position and hence rotate the panel 12 to its open end up position. The cam 174 is also driven in the same sense, but is, of course, is disengaged from the control lever 176 during this time. Having been disengaged from the dolly 88, switch 156 is spring pressed from its open position shown in Fig. 11 to a closed position.

When the dolly 88 reaches its upper position, the trip bar 159 mounted thereon strikes the lever of limit switch 157, opening the contacts 157–A and closing the contacts 157–B. Opening of the contacts 157–A opens the circuit through the contactor coil 224a, which opens the contacts 224c, 224d, 224e, to de-energize the inverter drive motor 160 and stop the dolly 88 at the position of switch 157 with the panel 12 at its open end up position shown in Fig. 2. The lever of safety switch 158 is located a slight distance beyond the limit switch 157 and is arranged to be tripped by the trip bar 159 in case the contacts 157–A of switch 157 do not open, and in that event, opening of the switch 158 will de-energize the inverter drive motor 160 as described.

Relay 220 comprises a latch coil 220a and a release coil 220e. When the latch coil 220a is energized, contact 220d is closed and contact 220c is open, and the contacts remain in this condition, even after the latch coil 220a has been de-energized, until the release coil 220e is energized. When the release coil 220e is energized, the movable contact arm 220b moves from contact 220d to contact 220c. The relay 220 is shown unlatched in Fig. 11.

When the contacts 157–B are closed, a circuit is completed through the latch coil 220a of relay 220. With the latch coil 220a thus energized, the movable arm 220b of relay 220 is moved from contact 220c to contact 220d to close a circuit through the coil 226 of time delay relay 226.

Sufficient time, for example 5 to 10 seconds, is allowed for dispensing of the phosphor slurry 228 into the panel 12 (Fig. 1). When the time runs out, the movable arm 226b of relay 226 is moved to contact 226c by the delay device 226, and a circuit is completed to solenoid 230 of the air cylinder 185 through normally closed switches 158, 156 and contact 218d of relay 218. When solenoid 230 is energized, the piston 184 (Fig. 9) is moved upwardly and is thereby released from its retracted position. The upward movement of the piston 184 frees the pin 198 (Fig. 10) from the upper bearing surfaces of the slots 200 so that the counterweight 180 falls. As the counterweight 180 falls, it moves the control lever 176 in a counterclockwise direction, and the end of the lever strikes the lower switch 208 closing the contacts thereof. This closes a circuit through the contacts 226b and 226c of relay 226, switches 158, 156, and contact 218d of relay 218 to the contactor coil 224a of relay 224, which energizes the inverter drive motor 160. The cam follower 182 also drops on the cam 174, and the lever 176 assumes a position which causes the output of the transmission 162 to drive the dolly 88 at a relatively slow speed in a counterclockwise direction as viewed in Fig. 2. When the dolly 88 moves, it disengages switch 157 whereby the contacts 157–A are spring pressed to the closed position and contacts 157–B are spring pressed to the open position, as shown in Fig. 11. During this time, the guide pin 198 (Fig. 10) assumes a free position within the slots 200 so that the control lever 176 is thereafter free to move under control of the cam 174.

As the dolly 88 moves down the circular track 86, the panel 12 is continually spinning and is being slowly tilted in order that the phosphor slurry 218 may swirl over and uniformly coat the glass face plate 76. Although it has been found satisfactory to spin the panel 12 at a constant speed, the spinning speed may be varied at any desired angle of tilt of the panel 12 by mounting a switch at the appropriate position adjacent to the track 86. Upon being tripped by the dolly 88 such a switch may be caused to operate a suitable circuit for changing the speed of the drive motor 139.

While the panel 12 is being tiled from its up position, the cam 174 is slowly driven counterclockwise as viewed in Fig. 9 until a point is reached on the cam 174 corresponding to approximately a 140° position of the panel 12. At this point the cam 174 runs out, the cam follower 182 on the control lever 176 becomes disengaged from the cam 174, and the counterweight 180 rotates the control lever 176 counterclockwise to a predetermined position controlled by the mechanical stop 206 which engages the other end of the lever 176. When the control lever is rotated, it disengages switch 208, thereby spring releasing the contacts thereof to the open position but the circuit to contactor 224 is still completed through contacts 157–A, which had been previously closed. Thus, with the control lever 176 in its new position the dolly 88 is caused to increase its speed in the same direction it was traveling, whereupon the panel 12 is rapidly tilted further to spill out any excess phosphor into a tub 232 (Fig. 1) and hasten the exit of the coated panel 12 from the station. When the dolly 88 reaches a position such that the panel 12 is in the same position where it entered, shown in phantom in Fig. 2, the trip bar 159 on the dolly 88 strikes the lever of limit switch 156 and opens the contacts thereof. This opens the circuit through the contactor coil 224a and stops the inverter drive motor 160 and hence the dolly 88, whereby the panel 12 assumes a stationary or dwell position for a short period of time. At this dwell position, the roller guide member 120 is again in alignment with the tilt rail 48 and also with a stationary guide rail 234 (Fig. 1) such that the guide member 120 closes the gap between the tilt rail 48 and the guide rail 234.

Just prior to the next index of the conveyor, switch 216 is opened automatically by means not shown, thereby opening the circuit through relay coil 218a, whereupon the arm 218b is spring pressed from contact 218d to contact 218c. This closes the circuit through the release coil 220e of relay 220, whereby the arm 220b is spring pressed from contact 220c to contact 220d. The coil 226a of time delay relay 226 is thus de-energized and its contacts 226b, 226c are returned by spring means to the open position. The circuits are thereby set for the next cycle of operation.

Thereafter, when the conveyor indexes to move the carrier 18 and panel 12 out of the phosphor screening station, the roller 46 leaves the roller guide member 120 and enters the stationary guide rail 234, permitting the panel 12 to continue on to the next station in the same inverted position.

Although the apparatus of the invention has been found particularly suitable for use in applying phosphor coatings to a cathode ray tube by a swirling operation, it may be used to apply other coatings to other kinds of workpieces by the same operation. Some of the advantages of the apparatus are its completely automatic operation in subjecting a workpiece to a series of motions, such as tilting and spinning, and its versatility and adaptness for changing the timing and speed of these motions. As a result, these operations are performed quickly, efficiently, and with a minimum of human error. Furthermore, where a coating operation is performed, uniformity of product is achieved in the resultant article.

Although the coating apparatus has been shown and described as embodied in a station where at the workpiece, such as the panel, is moved into the station by conveyor means, it is understood that the coating apparatus may be used as a stationary unit, independently of any conveyor system. This may be accomplished, for example, by using fixed support means rather than a movable carrier 18 for supporting the holder 38, and loading the panels at the stationary unit.

What is claimed is:
1. Apparatus for applying a uniform coating of liquid ingredients to the inner glass surface of a cathode ray tube panel, said apparatus comprising a holder adapted to engage said panel, means for rotating said holder about a first axis, means supporting said holder for tilting motion about a second axis perpendicular to said first axis, and means adapted to impart a tilting motion to said holder and the panel carried thereby about said second axis, said means including an arcuate shaped track formed with a concavity facing said holder, a dolly mounted on said track and adapted to be moved in either direction along the arcuate course defined by said track, and means connected between said dolly and said holder to tilt said holder about said second axis.

2. Apparatus adapted to tilt a work piece through a desired angle and to simultaneously spin the work piece, said apparatus comprising an arcuate shaped track having an axis extending normal to its radius of curvature, a dolly mounted on said track, said dolly being adapted to be moved along the arcuate course defined by said track, carrier means, a tubular housing, elements supporting said housing on said carrier for pivotal movement about said axis of said track, a spindle, means supporting said spindle in said housing for rotational movement about an axis perpendicular to said first mentioned axis, means extending from one end of said spindle and adapted to clamp a work piece, a rigid arm mounted on said dolly and including means releasably engaging said housing, means operatively connected to said spindle to rotate the same and to spin said work piece, and motor driven means connected to said dolly for driving said dolly along said track and thereby tilting said workpiece.

3. In a conveyor apparatus, a carrier means for moving said carrier along a predetermined path through a plurality of stations, support means on said carrier adapted to support a work piece and including elements supporting said support means from said carrier for pivotal movement about an axis, and means at one of said stations for tilting said work piece about said axis, said tilting means including a track formed in the shape of a circular arc having its center on said axis, a dolly mounted on and movable along said track, said dolly including a rigid arm extending radially inwardly towards said axis, means supported from the end of said arm and gripping said support means, and means for driving said dolly along said track.

4. In a conveyor apparatus, a carrier, means for moving said carrier along a predetermined path through a plurality of stations, support means on said carrier adapted to support a work piece and including elements supporting said support means from said carrier for pivotal movement about an axis parallel to said path, and means at one of said stations adapted to engage said support means and impart tilting movement thereto, said last mentioned means including a track formed in a circular arc having its center on said axis, a dolly mounted on said track and adapted to be moved along the arcuate course defined by said track, a rigid arm mounted on said dolly and having one end extending radially inwardly therefrom, and means supported from said one end of said arm and adapted to engage the means supporting said work piece.

5. Apparatus adapted to tilt a work piece through a desired angle, said apparatus comprising an arcuate shaped track having an axis extending normal to its radius of curvature, a dolly mounted on said track and adapted to be moved along the arcuate course defined by said track, means adapted to grip and support said work piece and including a holder, means supporting said holder for pivotal movement about said axis of said track, means connected to said dolly and including a releasable element engaging said holder, motor driven means connected to said dolly for driving said dolly along said track, switching means positioned in the path of said dolly for tripping by said dolly, and a driving mechanism responsive to said switching means and connected to said dolly.

6. In a conveyor apparatus, a carrier, means for moving said carrier along a predetermined path through a plurality of stations, support means on said carrier adapted to support a work piece, means supporting said support means from said carrier for tilting motion about an axis parallel to said path, said support means having an arm projecting therefrom adapted to be gripped for tilting said support means, and means at one of said stations for tilting said work piece about said axis, said tilting means including a track formed in a circular arc having its center on said axis, a dolly mounted on and movable along said track, a rigid member fixed to said dolly and extending therefrom radially inwardly towards said axis, and a slotted tubular member mounted on the end of said rigid member and extending parallel to said path, said tubular member being adapted to receive said arm for gripping.

7. Apparatus for applying a uniform coating formed from a slurry suspension of phosphor to the inner glass surface of a cathode ray tube panel, said apparatus comprising a holder adapted to engage and carry said panel, means supporting said holder for tilting motion about a first axis, means supporting said holder for rotational movement about a second axis transverse to said first axis, and means adapted to impart a tilting motion to said holder and panel about said first axis, said means including an arcuate shaped track formed with a concavity facing said holder, a dolly mounted on said track and adapted to be moved at least in one direction along the arcuate course defined by said track, means connected between said dolly and said holder, and driving means connected to said dolly for moving said dolly along said track and including means to vary the speed of said dolly at selected positions of said dolly on said track.

8. The invention as in claim 7 wherein said driving means includes a motor, and a variable speed transmission coupled between said motor and said dolly.

9. The invention as in claim 7, wherein said driving means includes a motor, a variable speed transmission means coupled between said motor and said dolly, and control means connected to said transmission means for varying the output speed of said transmission and the speed of said dolly.

10. The invention as in claim 7, wherein said driving means includes a motor, a variable speed transmission means coupled to said motor, said transmission including a speed control shaft, a speed reducer coupled between said transmission and said dolly, speed control means connected to said speed control shaft and including a lever and a cam engaging said lever at a location spaced from said speed control shaft, said cam being coupled to said speed reducer, whereby the position of said lever on said cam determines the output speed of said transmission.

11. Apparatus adapted to move a work piece in an arcuate path of predetermined radius, comprising a holder extending vertically and adapted to support said work piece at one end thereof, a support having pivot means spaced from said one end and engaging said holder on a horizontal axis, a track curved in a vertical plane and about a center on said axis and having a radius of curvature which is greater than said predetermined radius, means movable on said track and including a member engaging said holder at a location spaced from said pivot means, and means for moving said movable means on said track, whereby the angular rotation of said movable means causes said holder to rotate about said horizontal axis.

12. Apparatus adapted to move a work piece, said apparatus comprising a holder, means supporting said holder for pivotal movement about an axis, said means including structure mounting said holder for movement along a path, a track, means mounting said track adjacent to a predetermined location on said holder path, said track having a curvature lying in a plane with the center of said curvature on said axis when said holder is at said predetermined location, a dolly movably mounted on said track and having a portion extending into the path of said holder, motor means for moving said dolly on said track, and means for moving said holder on said mounting means structure to position said holder at said predetermined location.

13. Apparatus for tilting a workpiece through a desired angle, comprising a holder for said workpiece, means mounting said holder for pivotal movement about an axis, a track formed in the shape of a circular arc having its center of curvature on said axis, a dolly mounted on and movable along said track, said dolly being provided with a rigid arm extending radially inwardly towards said axis, means supported from the end of said arm and gripping said holder, and means for driving said dolly along said track.

14. Apparatus for tilting a workpiece through a desired angle, comprising an arcuate shaped track having an axis extending normal to its radius of curvature and provided with a concave surface, a holder for said workpiece, mounting means for said holder disposed adjacent to said concave surface of the track and provided with pivot means engaging said holder in line with said axis so that said holder is free to tilt about said axis, a dolly mounted on and movable along said track and extending towards said axis, means connecting said dolly to points of said holder spaced from said pivot means so that said holder is tilted about said axis when said dolly is moved, and means for driving said dolly along said track.

15. Apparatus adapted to tilt a workpiece through a desired angle, said apparatus comprising an arcuate shaped track having an axis extending normal to its radius of curvature, a dolly mounted on said track and adapted to be moved along the arcuate course defined by said track, means adapted to grip and support said workpiece and including a holder, means supporting said holder for pivotal movement about said axis of said track, means connected to said dolly and including a releasable element engaging said holder, and means connected to said dolly for driving said dolly along said track to tilt said holder and to reverse the direction of travel of said dolly at selected positions of said dolly on the track.

16. Apparatus for tilting and imparting rotational movement to a workpiece, said apparatus comprising a holder for said workpiece, means for rotating said holder about a first axis, means supporting said holder for tilting motion about a second axis perpendicular to said first axis, and means for imparting a tilting motion to said holder and workpiece about said second axis, said last mentioned means including an arcuate shaped track formed with a concavity facing said holder, a dolly mounted on and movable along said track, means connecting said dolly and holder, and means for driving said dolly along said track.

17. Apparatus for applying a uniform coating of a fluid material to the inner surface of a cathode ray tube panel, said apparatus comprising a holder adapted to engage said panel, means for rotating said holder about a first axis, means supporting said holder for tilting motion about a second axis perpendicular to said first axis, an arcuate track, and means movable along said arcuate track and operatively connected to said holder for subjecting said holder, and hence said panel, to said tilting motion.

References Cited in the file of this patent

UNITED STATES PATENTS

| | | |
|---|---|---|
| 2,215,735 | Jones | Sept. 24, 1940 |
| 2,662,829 | Krause | Dec. 15, 1953 |